US006977797B2

(12) United States Patent
Iino

(10) Patent No.: US 6,977,797 B2
(45) Date of Patent: Dec. 20, 2005

(54) CARTRIDGE HAVING A RECORDING MODE SWITCHING MEMBER

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 18 days.

(21) Appl. No.: 10/458,251

(22) Filed: Jun. 11, 2003

(65) Prior Publication Data

US 2003/0226925 A1 Dec. 11, 2003

(30) Foreign Application Priority Data

Jun. 11, 2002  (JP) ............................. 2002-169681

(51) Int. Cl.[7] .......................... G11B 23/02; G11B 23/03
(52) U.S. Cl. ...................................... 360/132; 720/743
(58) Field of Search ................... 360/132; 720/729, 720/743, 739; 242/347.1

(56) References Cited

U.S. PATENT DOCUMENTS

| 5,805,566 A | * | 9/1998 | Kobayashi ................... 720/729 |
| 6,349,892 B2 | * | 2/2002 | Morita et al. ............. 242/347.1 |
| 6,466,405 B1 | | 10/2002 | Rambosek ................... 360/132 |

* cited by examiner

Primary Examiner—David Davis
(74) Attorney, Agent, or Firm—Sughrue Mion, PLLC

(57) ABSTRACT

Possibility/impossibility of recording onto a recording medium accommodated in a cartridge is switched by moving a plug for preventing accidental deletion of information recorded on the recording medium along a bottom plate of a lower case. A projecting portion is formed at the plug. A flexible pin projects from an upper case so as to form a detent structure together with the projecting portion. At the time of joining together the upper and lower cases, even when the plug is positioned between a position which express possibility of recording and a position which express impossibility of recording, as the upper and lower cases are joined together, the pin relatively slides along an inclined surface formed at a top end of the projecting portion, and the plug moves to the position which makes recording possible. In this way, assemblability is good.

17 Claims, 12 Drawing Sheets

CARTRIDGE HAVING A RECORDING MODE SWITCHING MEMBER

CROSS-REFERENCE TO RELATED APPLICATION

This application claims priority under 35 USC 119 from Japanese patent Application No. 2002-169681, the disclosure of which is incorporated by reference herein.

BACKGROUND OF THE INVENTION

1. Field of the Invention

The present invention relates to a cartridge which accommodates a recording medium within a case, and which is equipped with a write protect function for switching between a state in which recording onto the recording medium is possible and a state in which recording onto the recording medium is not possible.

2. Description of the Related Art

Cartridges, which accommodate a recording medium within a case, are used as external recording media of computers and the like. Specifically, the cartridge is structured such that a recording medium, such as a recording tape wound on a reel or a disc-shaped disk medium or the like, is rotatably accommodated within a case which is formed so as to be hollow by peripheral walls of an upper case and a lower case being brought into contact with each other.

A write protect portion for preventing data recorded on the recording medium from being deleted accidentally, is provided at the cartridge. A structure having an operation hole passing through the rear wall of the case which is at the side opposite to the side of loading the case into a drive device, a through hole provided so as to pass through the bottom plate of the lower case, and a switching member which, due to an operation projection which is exposed from the operation hole being operated from the outer side of the case, moves along the bottom plate so as to open and close the through hole (or one end portion of a long hole when the through hole is a long hole), is known as a write protect portion.

Namely, at the write protect portion, for example, the state in which the switching portion closes the through hole is a state in which recording onto the recording medium (a magnetic tape or the like) by the drive device is not possible, and the state in which the switching member opens the through hole is a state in which writing onto the recording medium by the drive device is possible. Thus, it is possible to selectively switch between the non-recordable state and the recordable state (to select the possibility/impossibility of recording).

The write protect portion has a detent structure. The detent structure is formed by an abutment member which is provided at one of the case and the switching member, and a flexible member which is provided at the other of the case and the switching member and is elastically deformable. In the state in which the switching member closes the through hole, the flexible member abuts one surface of the abutment member. In the state in which the switching member opens the through hole, the flexible member abuts another surface of the abutment member such that inadvertent movement of the switching member is prevented. When the operation projection is operated, the flexible member elastically deforms while maintaining the state of abutting the abutment member, and imparts a detent sensation (a "notching" sensation) to the operator.

As the detent structure, a structure is known in which the abutment member, which is formed in a mountain shape as seen in plan view, is provided at the switching member, and a detent pin serving as the flexible member stands upright at the ceiling plate of the upper case. In this structure, the detent pin is provided at the ceiling plate which does not interfere with the locus of movement of the switching member which moves along the bottom plate. Therefore, as compared with a structure in which the flexible member is provided at the lower case, the write protect portion can be made more compact on the whole.

As described above, the switching member is a member which switches selectively between the possibility and the impossibility of recording onto the recording medium. Thus, the switching member must be securely positioned at the closing position or the opening position of the through hole (i.e., the recording-impossible position or the recording-possible position), and this is achieved by the abutment member and the flexible member abutting one another.

However, in the above-described conventional cartridge in which the switching member having the abutment member opens and closes the through hole of the bottom plate and the detent pin is provided at the upper case, the detent structure is not formed until the upper case is joined to the lower case. Before the upper case is joined to the lower case, the switching member can move freely. Thus, if the switching member is positioned so as to be offset from the closing position or the opening position at the time when the upper case and the lower case are joined together, the detent pin will abut (interfere with) the abutment member. Such interference will not only impede the joining together of the upper case and the lower case, but also may be a cause of the detent pin breaking.

Thus, there are the problems that, when the upper case and the lower case are joined together, careful and complex work for ensuring that the position of the switching member is not offset is required, and the assemblability of the cartridge is poor.

SUMMARY OF THE INVENTION

In view of the aforementioned, an object of the present invention is to provide a cartridge which has good assemblability, and in which an upper case and a lower case can be joined together even if the position of a switching member is offset.

In order to achieve the above object, a first aspect of the present invention is a cartridge for accommodating a recording medium, which cartridge has a first mode which prohibits recording of information onto the recording medium and a second mode in which recording of information onto the recording medium is possible, the cartridge comprising: a case provided with a lower case having a bottom plate, and an upper case joined together with the lower case so as to have an accommodating space at an interior, the recording medium being accommodated in the interior; a switching member for switching the mode, which is provided so as to be movable along the bottom plate of the lower case between a first position corresponding to the first mode and a second position corresponding to the second mode, and which is selectively positioned at the first position and the second position; a flexible member having flexibility and provided within the case so as to generate urging force in a restoring direction by being bent; and an abutment member having a region which is abutted by the flexible member, wherein the flexible member and the abutment member are disposed so as to form a structure for cooperating with each other to position the switching member at one of the first position and the second position, the abutment member has at least one inclined surface, and when the upper case and the lower case are moved relatively so as to be joined together, the flexible member abuts the inclined surface and relatively slides on the inclined surface, whereby relative positions of the flexible member and the abutment member are determined and the switching member is positioned at one of the first position and the second position.

The aforementioned cooperating structure is generally called a detent mechanism. In a detent mechanism, when the region is operated via an operation projection, such as, a lever or the like, so as to move from one position to another position between two positions, the direction of urging force applied to this region is switched along the way, and the detent mechanism works to maintain a selected position.

The abutment member receives urging force from the flexible member at the region abutted by the flexible member, and urges the switching member in the direction toward the first position or the second position. The region abutted by the flexible member has two different surfaces. In accordance with the surface which is abutted, the direction of the urging force received from the flexible member changes, and the direction of the switching member is switched between the direction toward the first position and the direction toward the second position. When the switching member is moved from one of the first and second positions to the other position, the flexible member rides up over the one surface which the abutment member abuts, and abuts the other surface, and changes the direction of urging.

Namely, the cartridge has a case which is formed by the joining together of an upper case and a lower case, and which accommodates, at an interior of the case, a recording medium; a switching member provided at the lower case, and moving in a direction along a bottom plate of the lower case, and able to be selectively positioned at a recording-impossible position which makes recording of information onto the recording medium impossible, and a recording-possible position which cancels the recording-impossible state; an abutment member provided at one of the upper case and the switching member; a flexible member (detent portion) provided at the other of the upper case and the switching member, and disposed so as to abut the abutment member, and when the switching member moves, the flexible member elastically deforms and imparts a detent sensation, while maintaining the abutted state; and an inclined surface formed at the abutment member so as to be inclined with respect to a direction of joining the upper case and the lower case and a moving direction of the switching member, and when the upper case is joined to the lower case in a state in which the switching member is positioned between the recording-impossible position and the recording-possible position, the inclined surface moves the switching member to the recording-impossible position or the recording-possible position while the flexible member slides along the inclined surface.

In the cartridge of the first aspect, due to the switching member moving in a direction along the bottom plate of the lower case (a horizontal direction which is a direction perpendicular to the direction of joining the upper case and the lower case together), the switching member can be selectively switched between a state in which recording onto the recording medium accommodated in the case is possible and a state in which recording is impossible (the possibility/impossibility of recording is switched). The flexible member and the abutment member always abut one another and prevent inadvertent movement of the switching member (inadvertent switching of the possibility/impossibility of recording). At the time of switching, a detent sensation is imparted due to the flexible member elastically deforming.

At the time of assembling the cartridge, the switching member is assembled into the lower case. In this state, the switching member can freely move between the recording-impossible position and the recording-possible position. Next, the upper case is joined to the lower case.

At this time, when the switching member is positioned between the recording-impossible position and the recording-possible position which the switching member should be selectively positioned at, in other words, when the position of the switching member is offset, the flexible member, which is provided at one of the upper case and the switching member, abuts the inclined surface of the abutment member which is provided at the other. This inclined surface is inclined with respect to both of the direction of joining the upper case and the lower case together and the moving direction of the switching member. Thus, the switching member is moved to the closing position or the opening position while the flexible member slides therealong.

In other words, the moving force in the direction of joining the upper case and the lower case together is converted, by the inclined surface, into moving force which moves the switching member. As the upper case and the lower case are joined together, the switching member moves to the recording-possible position or the recording-impossible position. Thus, even if the position of the switching member is offset at the time when the upper case and the lower case are joined together, the switching member moves to an appropriate position and the flexible member and the abutment member are in an appropriate state of abutment, while the joining together of the upper case and the lower case is carried out correctly.

In this way, in the cartridge of the above-described aspect, the assemblability is good, and the upper case and the lower case can be joined together even if the position of the switching member is offset.

Further, in the cartridge having the above-described structure, a structure may be used in which the inclined surface is a one-side inclined surface, and when upper case is joined to the lower case in a state in which the switching member is positioned between the recording-impossible position and the recording-possible position, the switching member is moved to one of the recording-impossible position and the recording-possible position. In this structure, because the inclined surface is a one-side inclined surface, merely due to the operation of joining the upper case to the lower case, the switching member can be placed at a position (e.g., the recording-possible position) which is decided on for the time the cartridge is shipped, among the recording-impossible position and the recording-possible position. Thus, such a structure is suitable.

BRIEF DESCRIPTION OF THE DRAWINGS

FIG. 5A is a plan view showing an initial state of engagement of an engagement projection of a drive device with an operation projection of a door, FIG. 5B is a plan view showing a state in the midst of opening the opening, and FIG. 5C is a plan view showing a state in which opening of the opening has been completed.

FIG. 9A is a perspective view as seen from the front side and above, and FIG. 9B is a perspective view as seen from the rear side and below.

FIG. 10A is a perspective view showing a state in which recording onto a magnetic tape is possible, and FIG. 10B is a perspective view showing a state in which recording onto the magnetic tape is not possible.

FIG. 11A is a perspective view showing a state in which recording onto the magnetic tape is possible, and FIG. 11B is a perspective view showing a state in which recording onto the magnetic tape is not possible.

DETAILED DESCRIPTION OF THE INVENTION

Hereinafter, a recording tape cartridge 10 relating to an embodiment of the present invention will be described on the basis of FIGS. 1 through 12. First, the basic overall structure of the recording tape cartridge 10, and the structures of an opening and a door will be described. Then, a write protect portion 60, which is the main portion of the present invention, will be described. Note that, for convenience of explanation, the direction of loading the recording tape cartridge 10 into a drive device, which is denoted by arrow A, is the forward direction (front side) of the recording tape cartridge 10. The directions of arrow B and arrow C, which are orthogonal to the direction of arrow A, are the rightward direction and the leftward direction, respectively.

(Overall Structure of Recording Tape Cartridge)

Figure 1:
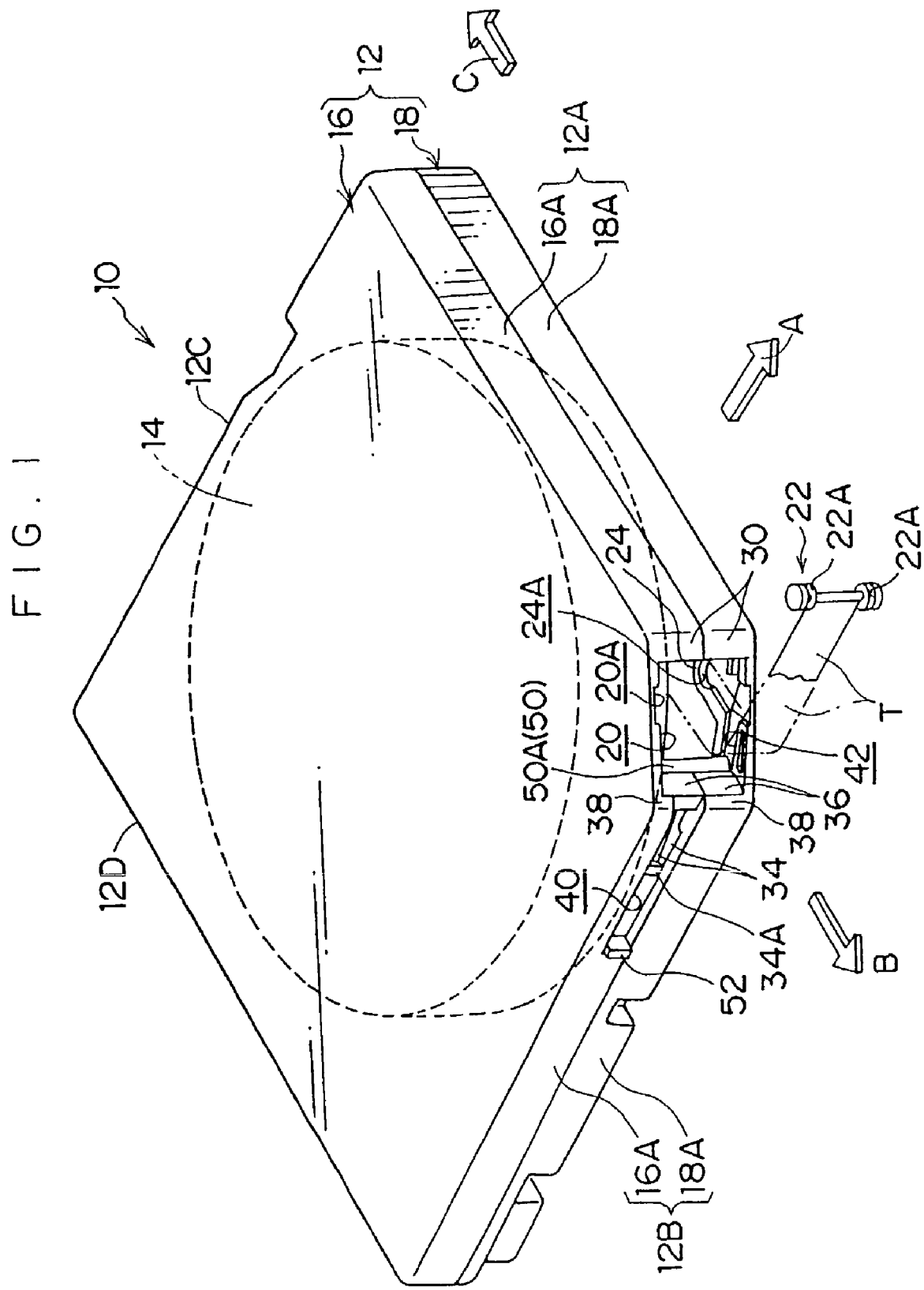
FIG. 1 is a perspective view showing the overall structure of a recording tape cartridge relating to an embodiment of the present invention.
Figure 2:
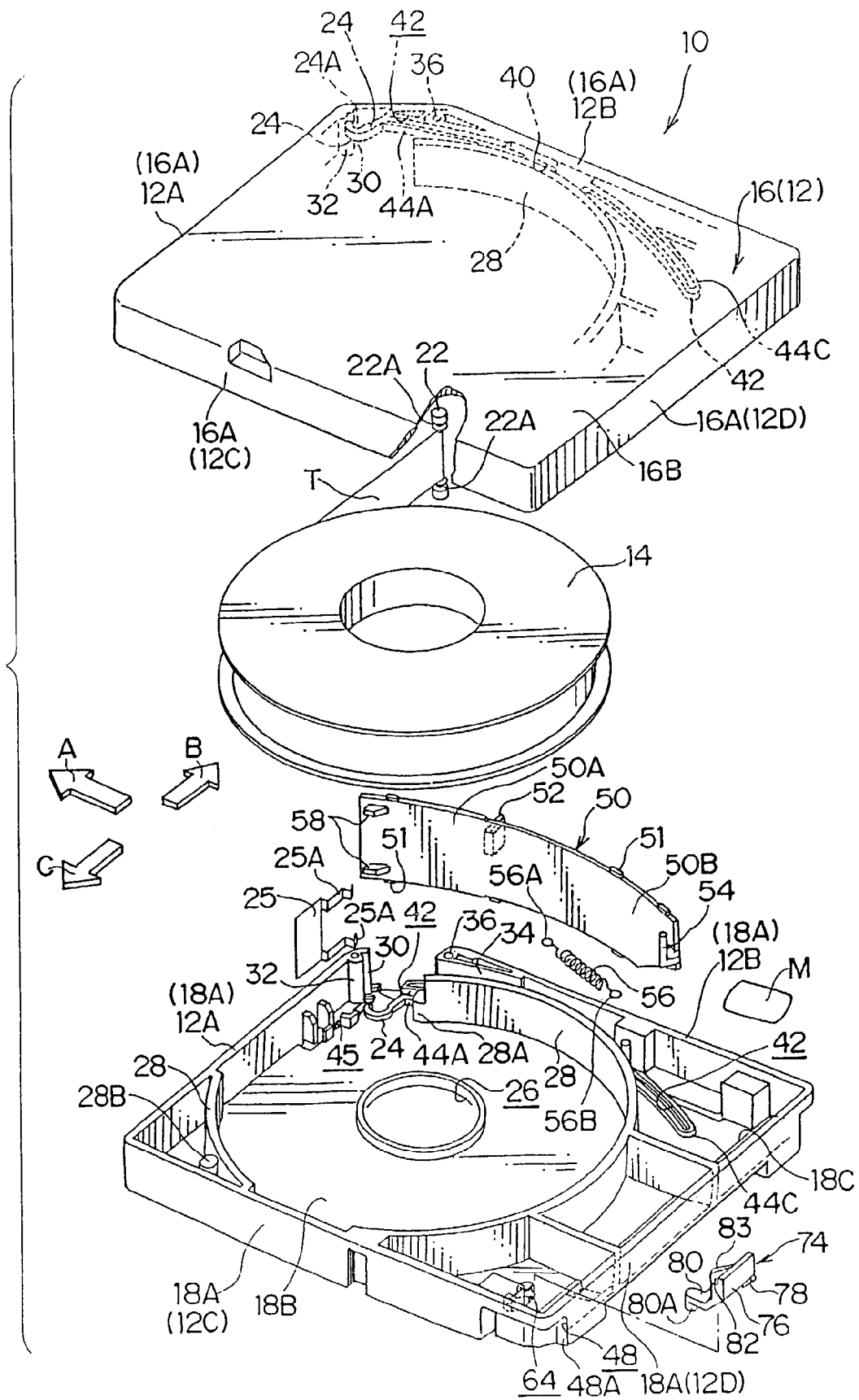
FIG. 2 is an exploded perspective view of the recording tape cartridge relating to the embodiment of the present invention.

The overall structure of the recording tape cartridge 10 is shown in perspective view in FIG. 1, and a schematic exploded perspective view of the recording tape cartridge 10 is shown in FIG. 2.

As shown in these figures, the recording tape cartridge 10 is structured such that a single reel 14, on which is wound a magnetic tape T serving as a recording tape which is an information recording/playback medium, is rotatably accommodated within a case 12 which is substantially rectangular as seen in plan view.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12. Further, the corner portion of each of the upper case 16 and the lower case 18, at which corner portion the peripheral walls 16A, 18A have been cut, forms an opening 20 for pulling-out of the magnetic tape T. The detailed structures of the opening 20 and a door 50 which open and closes the opening 20 will be described later.

A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

A pair of upper and lower pin stands 24, which position and hold the leader pin 22 within the case 12, are provided at the inner side of the opening 20 of the case 12. The pin stands 24 are formed in semicylindrical shapes which open in the direction of arrow B. The both end portions of the leader pin 22, which is in a state of standing upright, are held in concave portions 24A of the pin stands 24. The pin stands 24 are continuous with ribs 44 which will be described later.

An anchor spring 25 is fixed in a vicinity of the pin stands 24. The anchor spring 25 engages the upper and lower end portions of the leader pin 22 and holds the leader pin 22 in the pin stands 24. When the leader pin 22 enters into and exits from the pin stands 24, arm portions 25A of the anchor spring 25 are elastically deformed appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

A bag portion (concave portion) 28A, in which a hole for position regulation is formed, is provided so as to be continuous with the end portion of the play restricting wall 28 in a vicinity of the opening 20. Further, a bag portion 28B, in which is formed a hole for position regulation which is a long hole, is provided in the space between the play restricting wall 28 and the front left corner portion of the case 12. The bag portions 28A, 28B are disposed on a single straight line which extends along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the right rear portion of the lower case 18 for each recording tape cartridge 10. A portion of an inclined rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear wall side.

(Opening, and Structure of Case in Vicinity of Opening)

Figure 3:
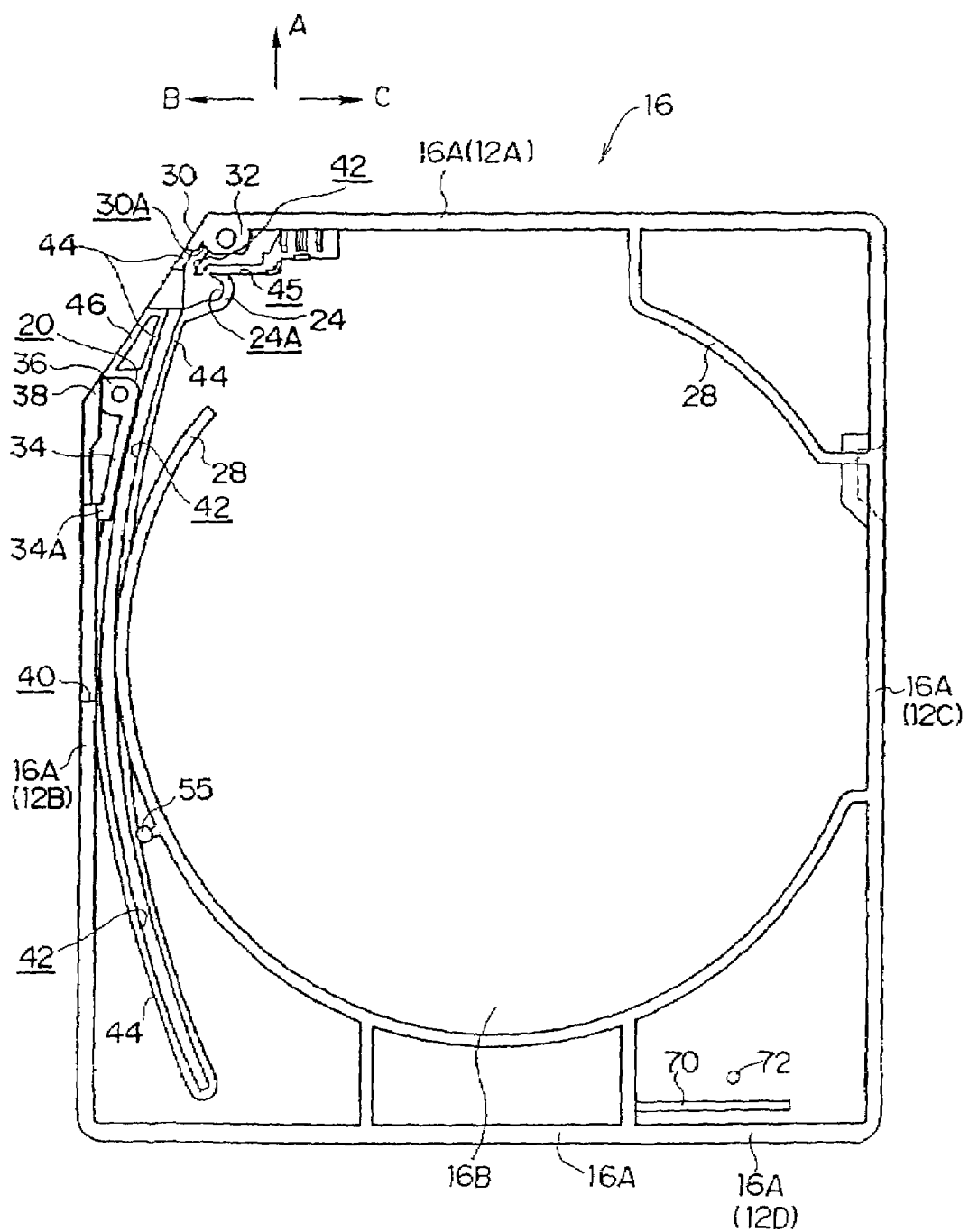
FIG. 3 is a bottom view of an upper case forming the recording tape cartridge relating to the embodiment of the present invention.
Figure 4:
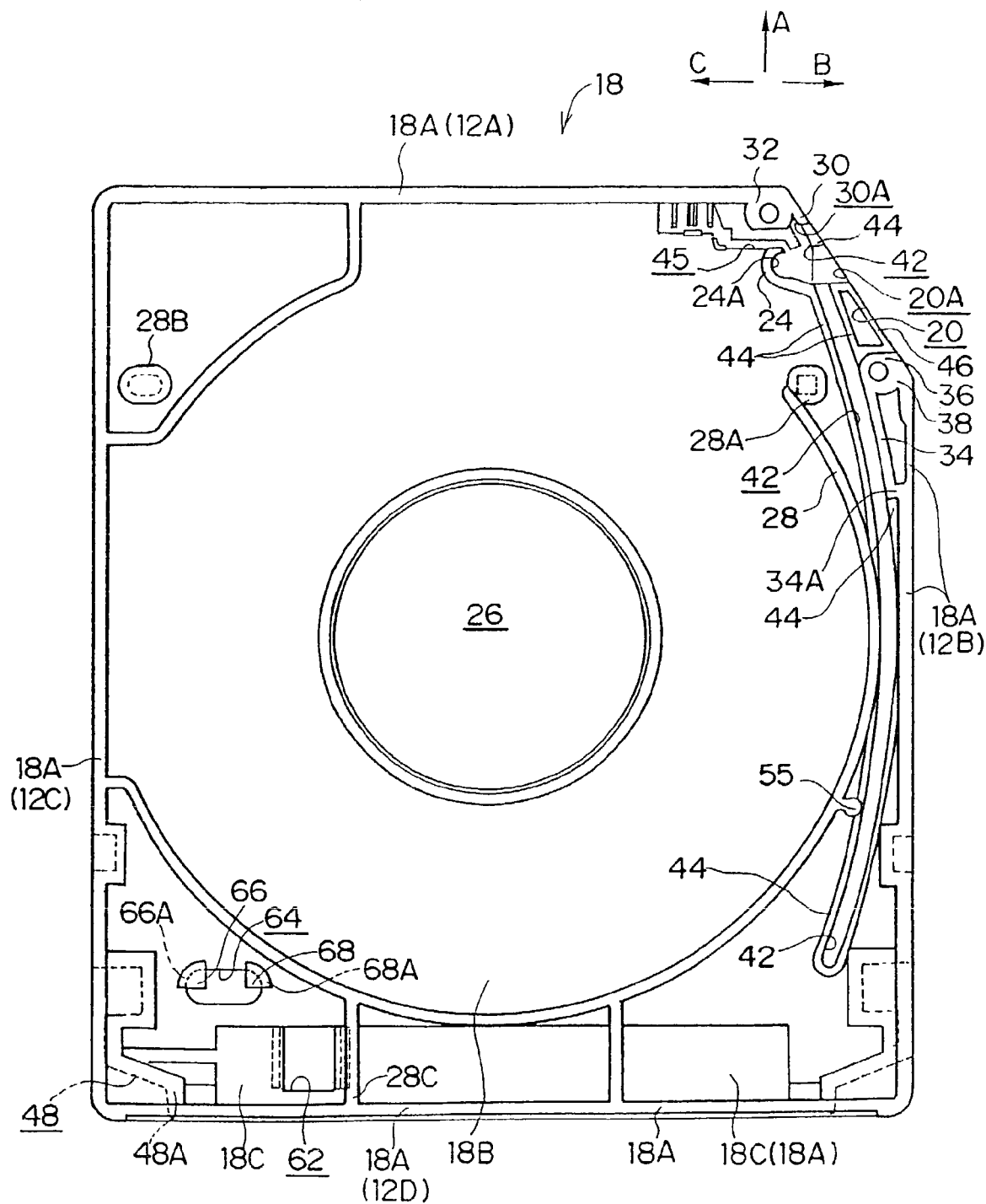
FIG. 4 is a plan view of a lower case forming the recording tape cartridge relating to the embodiment of the present invention.

As shown in FIG. 3, which is a bottom view of the upper case 16, and in FIG. 4, which is a plan view of the lower case 18, pairs of upper and lower screw bosses 32, 36 are provided at the front and rear edge portions of the opening 20. The screw bosses 32, 36, as well as other screw bosses which are not illustrated, are for the screwing-in of screws for joining the upper case 16 and the lower case 18 together.

The screw bosses 32, which are positioned at the front edge portion of the opening 20, are continuous with (are provided so as to be connected to) the right end portion of a front wall 12A of the case 12 (the front wall 12A is the portions of the peripheral walls 16A, 18A whose outer surfaces are directed in the direction of arrow A), and a pair of upper and lower dustproofing walls 30 which are short and are bent along the plane of opening of the opening 20 from the right end portion of the front wall 12A. Concave portions 30A, into which the distal end portion of the door 50 which will be described later enters, are formed between the screw bosses 32 and the dustproofing walls 30.

The screw bosses 36, which are positioned at the rear edge portion of the opening 20, are continuous with bent walls 38 and with the front end portions of a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to (the locus of movement of) the outer peripheral surface of the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16.

A guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a bottom plate 18B of the lower case 18, the right wall 12B (either the peripheral wall 16A or the peripheral wall 18A), and the play restricting walls 28. The guide grooves 42 are formed without making the ceiling plate 16B or the bottom plate 18B thinner. The ribs 44 are continuous with the pin stands 24.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the play restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the play restricting walls 28).

Due to the rib 44 being cut-out at the right of the pin stand 24, the portion of the guide groove 42 positioned at the opening 20 communicates with the concave portion 24A, and also communicates with a spring groove 45 at which the arm portion 25A of the plate spring 25 is disposed. Further, at the cut-out portion of the guide groove 42, a taper opening 20A, which guides the leader pin 22 into the case 12, communicates with the concave portion 24A of the pin stand 24. Moreover, a rib 46, which is formed along the rear edge of the taper opening 20A, the front edge of the screw boss 36, and the plane of opening of the opening 20, is continuous with the rib 44. The strength of the case 12 around the opening 20 is thereby ensured or improved.

Moreover, the rib 44, which forms the rear half portion of each guide groove 42, is folded back, at the rear end portion thereof, in a substantial U shape and is closed. The rib 44 of the upper case is longer toward the rear than the rib 44 of the lower case 18. This is so that the memory board M, which is disposed at the right wall 12B side of the inclined rear wall 18C (peripheral wall 18A) of the lower case 18 which is an inclined surface of a predetermined angle, does not interfere with the door 50.

Moreover, a pair of top and bottom spring catching pins 55 are formed at the longitudinally central portions of the inner side portions of the rear half portion ribs 44. The spring catching pins 55 are continuous with (are provided so as to connect to) the play restricting walls 28. The spring catching pin 55 at the lower case 18 is formed to be longer. A one end side annular portion 56A of a coil spring 56 which will be described later catches on the portion of this spring catching pin 55 which projects further upwardly than the play restricting wall 28. The coil spring 56 is prevented from falling out due to the short spring catching pin 55 at the upper case 16 being brought into contact with the spring catching pin 55 at the upper case 18.

The upper case 16 and the lower case 18, which are as described above, are fixed (joined) together by unillustrated screws being screwed, from beneath, into the screw bosses 32, 36 and other screw bosses, in the state in which the peripheral walls 16A, 18A contact one another. Further, the opening 20 is formed by cutting off the front right corner portion of the case 12, and the plane of opening of the opening 20 is directed in the direction of arrow A and the direction of arrow B. Thus, the pull-out mechanism of the drive device can access and engage (chuck) the leader pin 22 from the direction of arrow A, from the direction of arrow B, or from between the direction of arrow A and the direction of arrow B. In this way, the area at which the pin stands 24, which hold the leader pin 22, can be set is broad, and the region over which the pull-out mechanism of the drive device can engage the leader pin 22 is broad. Thus, the position at which the pin stands 24 are set can be set in accordance with the specifications of the drive device which engages the leader pin 22 from the direction of arrow A or the direction of arrow B. Therefore, the degrees of freedom in designing the drive device are increased.

(Structure of Door)

The above-described opening 20 is opened and closed by the door 50 which serves as a shielding member. The door 50 is formed in an arc-shape which curves along the direction of plate thickness thereof, and whose curvature as seen in plan view coincides with the curvature of the guide grooves 42 (the predetermined circumference). Further, the portion of the door 50 at the front portion thereof (at least the portion thereof which closes the opening 20) where the plate width (height) is formed to be substantially equal to the opening height of the opening 20, is a closing portion 50A. The portion of the door 50 which is at the rear side of the closing portion 50A and whose plate width is slightly smaller than that of the closing portion 50A, is a driving portion 50B.

Figure 5A:
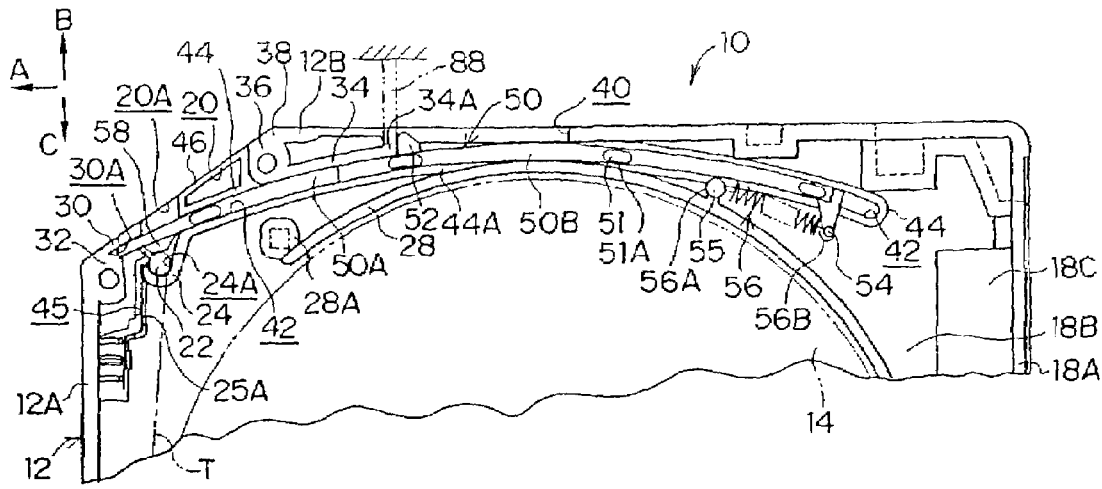
FIGS. 5A, 5B, and 5C are views, as seen with the upper case removed, showing processes of opening an opening of the recording tape cartridge relating to the embodiment of the present invention, where
Figure 5B:
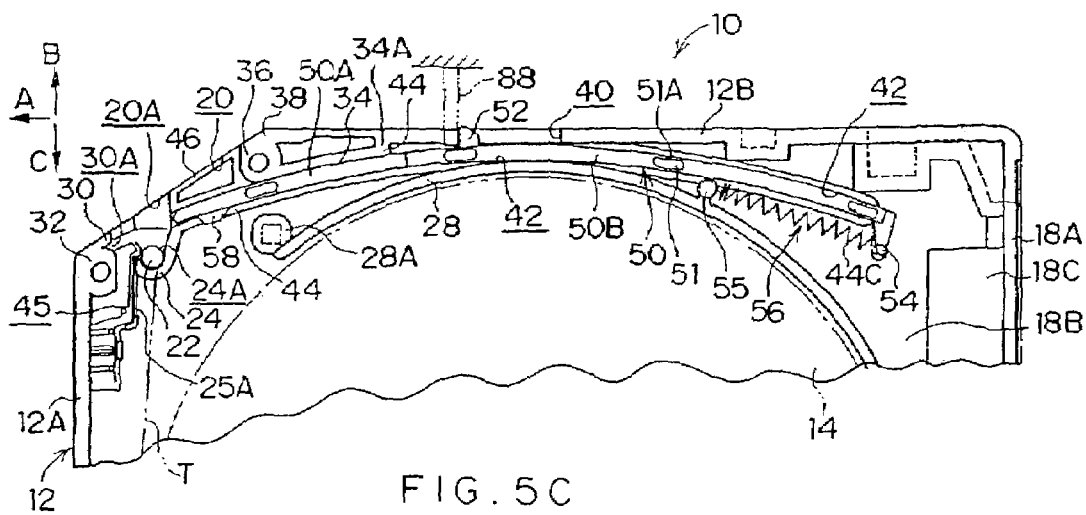
Figure 5C:
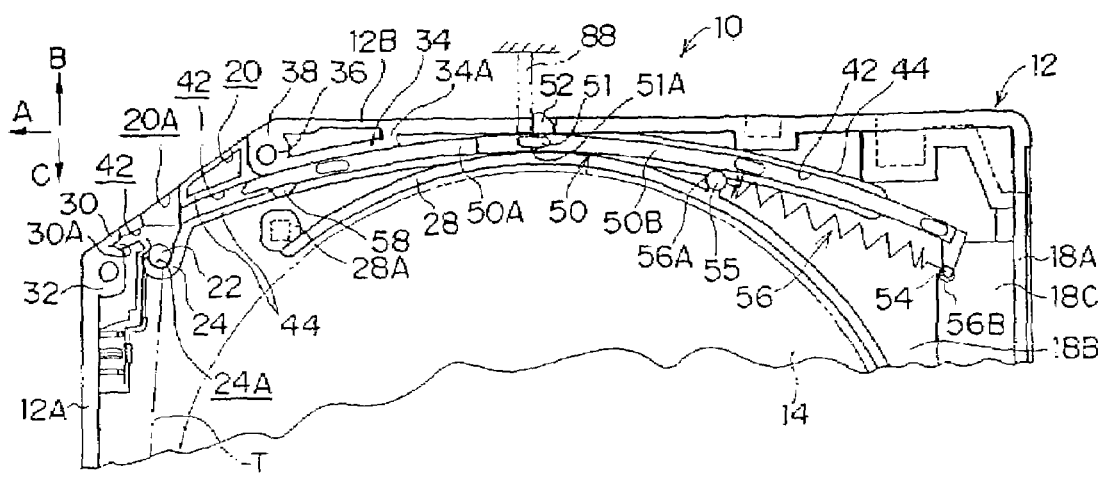

The plate length of the door 50 (the curved longitudinal dimension thereof) is determined such that, in both states in which the door 50 opens and closes the opening 20, the rear end portion of the driving portion 50B is positioned in the right rear corner portion of the case 12 (see FIGS. 5A to 5C). Note that the bottom rear portion of the driving portion 50B is cut obliquely in order to avoid the memory board M which is disposed at the inclined surface of the inclined rear wall 18C of the lower case 18.

The door 50 closes the opening 20 (see FIG. 5A) in a state in which the distal end portion of the closing portion 50A enters into the concave portions 30A which are positioned at the outer sides of the screw bosses 32. The door 50 opens the opening 20 (see FIG. 5B) by moving (rotating) substantially rearward along the guide grooves 42. When the outer peripheral surface of a vicinity of the distal end of the closing portion 50A reaches the inner sides of the screw bosses 36, the opening 20 is completely opened (see FIG. 5C). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of the door 50 (the configuration of the guide grooves 42) to be appropriately determined in accordance with the angle of the plane of opening of the opening 20 which is determined by the requirements of the library device, or in accordance with the positions of the front and rear edge portions of the opening 20 (the screw bosses 32, 36) which are determined by the requirements of the drive device, or the like.

Further, a plurality of convex portions 51, which enter into the upper and lower guide grooves 42, project at the upper and lower ends of the door 50. The projecting heights of the convex portions 51 differ at the closing portion 50A and the driving portion 50B. However, the distance from the central line in the width of the door 50 (the central line along the longitudinal direction of the door 50) to the peak portion of each convex portion 51 is constant. In this way, the top and bottom convex portions 51 slide along the ceiling plate 16B or the bottom plate 18B which are the bottom portions of the guide grooves 42.

Projections 51A, whose peak portions run along the surfaces (i.e., the end surfaces in the direction of the plate thickness) of the door 50, project at the both sides, in the direction of plate thickness of the door 50, of each convex portion 51. The projections 51A slide along the groove walls of the guide grooves 42 (i.e., the ribs 44 and the like). Note that the convex portion 51 which is positioned furthest toward the front is disposed such that, when the opening 20 is being opened or closed, this convex portion 51 does not enter into the taper opening 20A which communicates with the guide groove 42.

At the time when the door 50 is opening and closing the opening 20, the door 50 is guided in the guide grooves 42 by the convex portions 51 and the projections 51A, and does not jut out from the aforementioned locus of movement. The door 50 threads its way through at the outer sides of the screw bosses 32 and the inner sides of the screw bosses 36 and between the right wall 12B and the play restricting walls 28, and moves reliably.

The operation projection 52, which serves as an operation portion, projects along the circumferential direction of the door 50 at the outer peripheral portion, in a vicinity of the front end (the closing portion 50A side) of the driving portion 50B of the door 50. The operation projection 52 is exposed to the exterior of the case 12 from the slit 40. The operation projection 52 moves the door 50 in the direction of opening the opening 20 by engaging with an engagement projection 88, which enters in from the portion of the slit 40 opening toward the front, as the recording tape cartridge 10 is loaded (moves relatively) into the drive device.

A substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging means. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50.

In this way, the door 50 is urged in the direction of closing the opening 20 by the urging force of the coil spring 56, and usually closes the opening 20. As described above, the coil spring 56 has a length which reaches the rear right corner portion of the case 12 in the state in which the door 50 closes the opening 20. Therefore, the space between the play restricting walls 28 and the peripheral walls 16A, 18A (the inclined rear wall 18C) at this rear right corner portion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like.

Due to the operation of the recording tape cartridge 10 being loaded into a drive device, the operation projection 52 engages with the engagement projection 88 of the drive device (see FIGS. 5A through 5C). In this way, the above-described door 50 moves with respect to the case 12 against the urging force of the coil spring 56, and opens the opening 20. When the recording tape cartridge 10 is to be ejected from the drive device, the door 50 closes the opening 20 by the urging force of the coil spring 56.

The door 50, which is curved in an arc-shape, opens and closes the opening 20 (which is inclined with respect to the direction of arrow A) by rotating so as to circle around the outer sides of the reel 14 and the pin stands 24 (the leader pin 22), without jutting out from the locus of movement which runs along the curved configuration of the door 50. Thus, at the time of opening and closing the opening 20, the door 50 does not jut out from the region prescribed by the outer shape of the case 12.

(Structure of Write Protect Portion)

Figure 6:
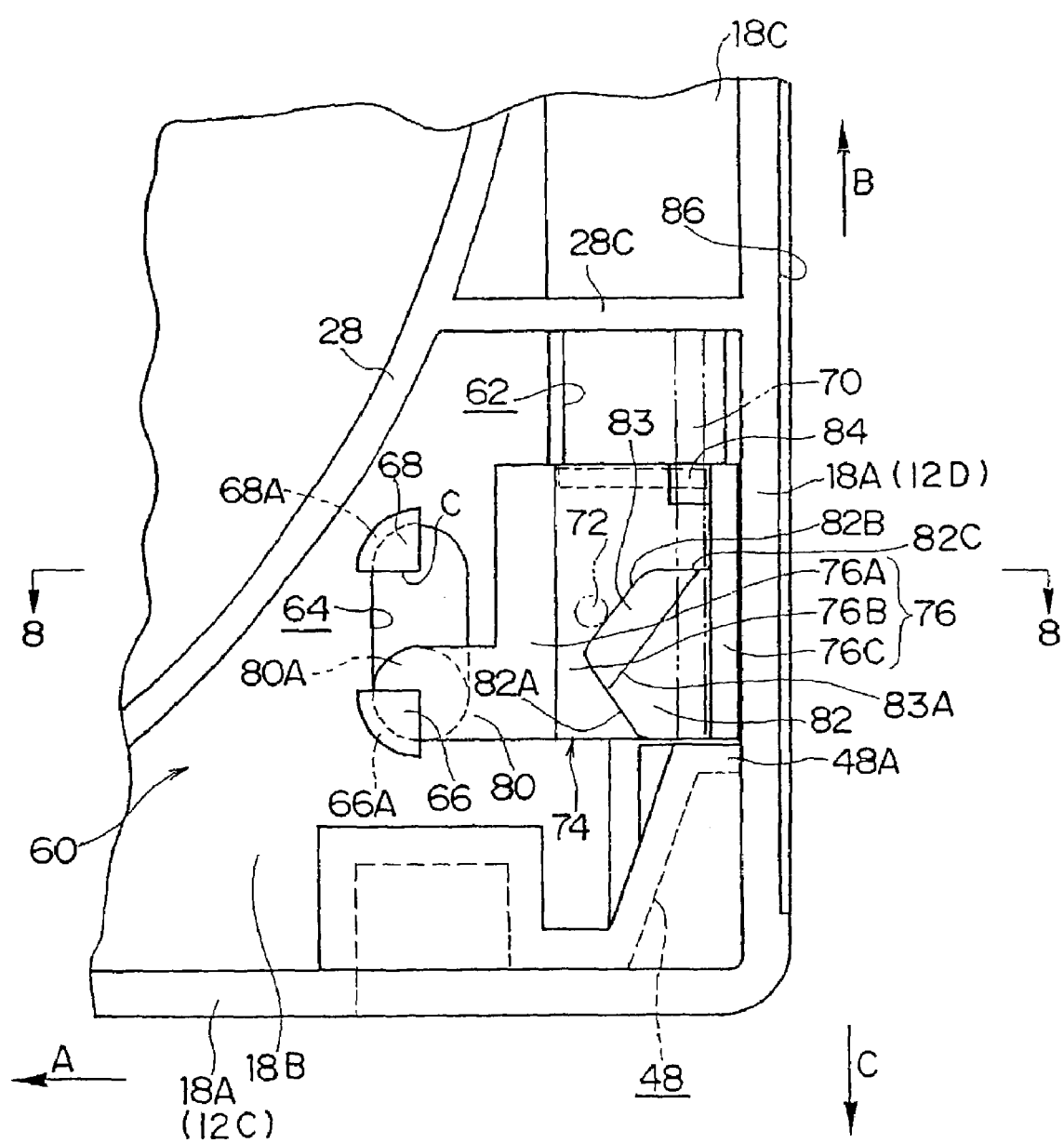
FIG. 6 is a plan view, as seen with the upper case removed, showing a write protect portion of the recording tape cartridge relating to the embodiment of the present invention.

As shown in FIG. 6, the write protect portion 60 is provided at the left side of the rear portion of the case 12 which is partitioned by the play restricting walls 28 and the like (i.e., is provided at the side opposite the side where the memory board M is disposed). Hereinafter, description will be given in which the portions of the peripheral walls 16A, 18A at which the outer surfaces face in the direction of arrow C are a left wall 12C, and the portions of the peripheral walls 16A, 18A (except for the inclined rear wall 18C) at which the outer surfaces face in the rear direction which is opposite to the direction of arrow A are a rear wall 12D.

As shown in FIGS. 4 and 6, the write protect portion 60 has an operation hole 62 which passes through the inclined rear wall 18C of the lower case 18, and a recognition opening 64 which passes through the bottom plate 18B.

The operation hole 62 is rectangular, and an operation projection 78 of an accidental deletion preventing plug 74 which will be described later enters therein. This operation hole 62 is formed such that the outer surface side of the inclined rear wall 18C is formed to be slightly wider in the left-right direction than the inner surface side. The operation projection 78 can easily be operated from the outer side. Further, the right edge of the operation hole 62 at the inner side of the case 12 substantially coincides with the left end surface of a partitioning wall 28C which connects the play restricting wall 28 and the inclined rear wall 18C (the peripheral wall 18A).

On the other hand, the recognition opening 64 is provided so as to be offset toward the left at the front side of the operation hole 62. The recognition opening 64 is a long hole whose both ends are rounded in correspondence with a recognition portion 80A (which will be described later) of the accidental deletion preventing plug 74. The left edge of the recognition opening 64 substantially coincides with the right (inner) end surface of a wall portion 48A for forming a concave portion 48 at the left rear corner portion of the case 12. The wall portion 48A and the partitioning wall 28C are the limits of movement (are stoppers) of the left-right direction movement of the accidental deletion preventing plug 74.

Figure 7:
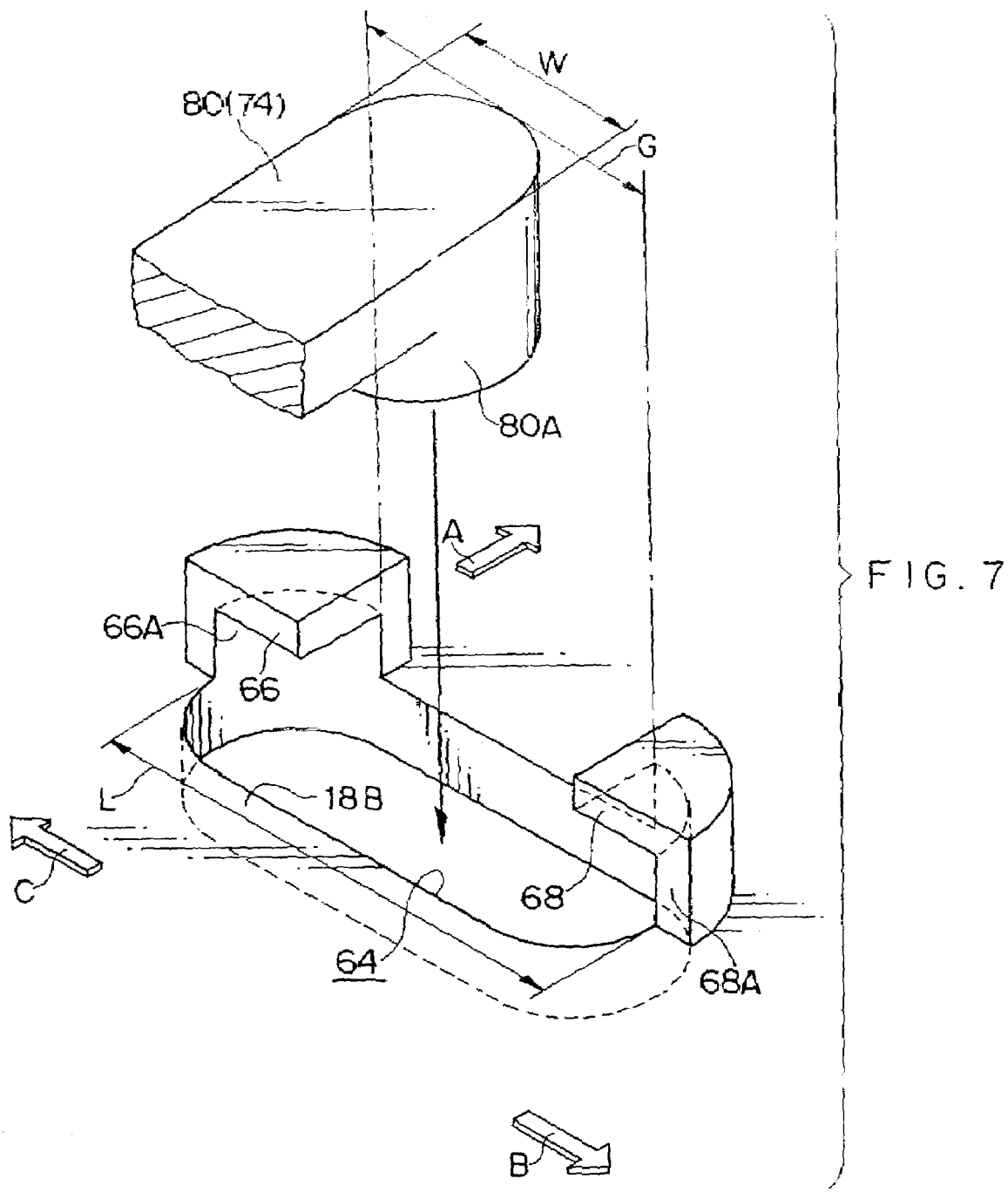
FIG. 7 is an enlarged perspective view showing the dimensional relationship between a recognition opening, guide pieces, and an arm portion, which structure the write protect portion of the recording tape cartridge relating to the embodiment of the present invention.

Guide pieces 66, 68 which structure a guide member are provided at the lower case 18. As shown in FIG. 7, the guide piece 66 is provided at the top end of a leg portion 66A which is arc-shaped in plan view (sectional view) and which stands upright from the bottom plate 18B along the front half portion of the rounded left end of the recognition opening 64. The guide piece 66 forms a fan-shape which juts out over the front half portion of the recognition opening 64 (i.e., covers the front half portion of the recognition opening 64). Namely, the guide piece 66 on the whole faces the recognition opening 64, and there is no portion thereof which opposes the bottom plate 18B.

The guide piece 68 is formed so as to be symmetrical to the guide piece 66, with respect to a longitudinal direction central line (not shown) of the recognition opening 64. Namely, the guide piece 68 is provided at the top end of a leg portion 68A which stands upright from the bottom plate 18B along the front half portion of the rounded right end of the recognition opening 64. The guide piece 68 forms a fan-shape which juts out over the front half portion of the recognition opening 64.

These guide pieces 66, 68 are used for restricting (preventing) vertical direction movement of the accidental deletion plug 74. A gap G (see FIG. 7), which is larger than a width W of an arm portion 80 (to be described later) of the accidental deletion preventing plug 74, is provided between the guide pieces 66, 68. As described above, the guide pieces 66, 68 are provided so as to jut out above the recognition opening 64 from the leg portions 66A, 68A which stand erect along the edge portion of the recognition opening 64 (i.e., the guide pieces 66, 68 on the whole face the recognition opening 64). The guide pieces 66, 68 can thereby be molded integrally with the lower case 18 without providing undercut portions.

Figure 8:
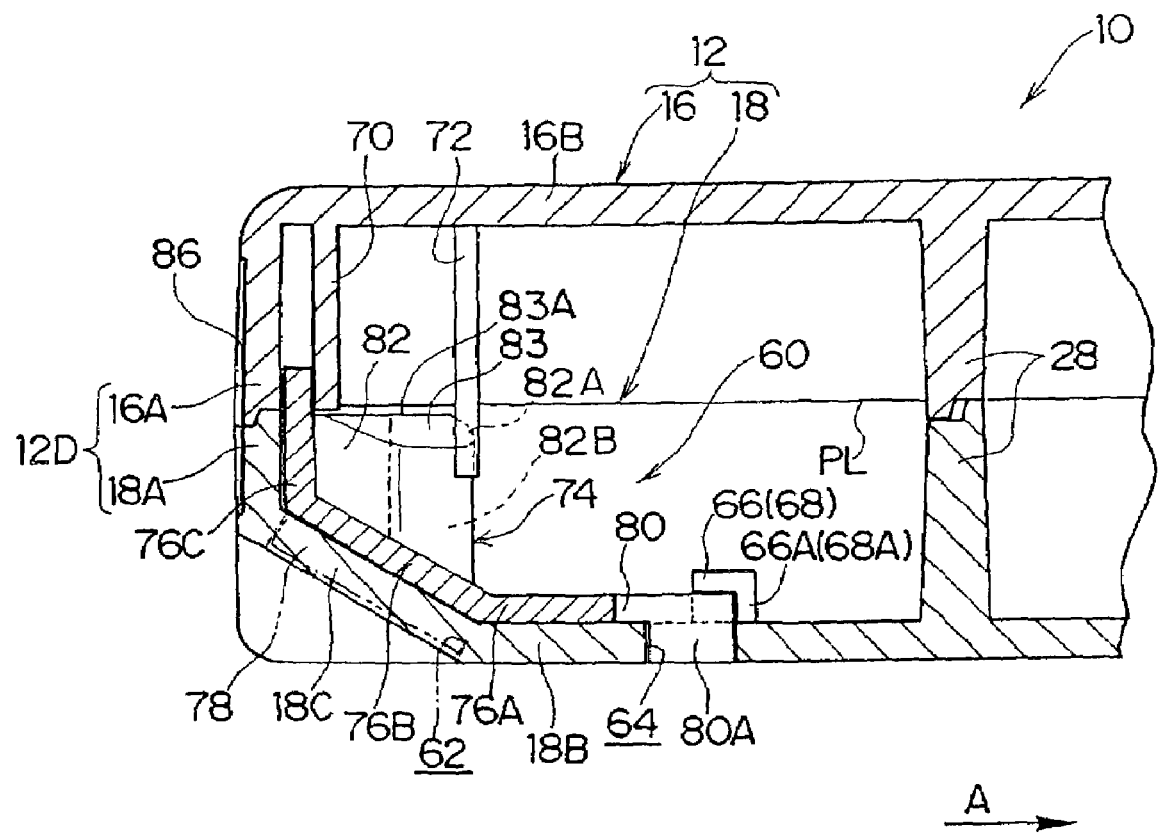
FIG. 8 is a sectional view taken along line 8—8 of FIG. 6.

As shown in FIG. 3 and FIG. 8, the write protect portion 60 is provided with a guide wall 70 which forms a guide member. The guide wall 70 stands erect from the ceiling plate 16B of the upper case 16, and is substantially parallel to the rear wall 12D. The partitioning wall 28C of the upper case 16 is the proximal end of the guide wall 70, and a position corresponding to the wall portion 48A is the final end of the guide wall 70. Namely, the guide wall 70 is positioned over the entire range of movement of the accidental deletion preventing plug 74, and is for restricting (preventing) movement of the accidental deletion preventing plug 74 in the front-back direction and the vertical direction.

Moreover, a detent pin 72 serving as the flexible member in the present invention stands erect from the ceiling plate 16B of the upper case 16. The detent pin 72 is formed as a thin solid cylinder whose length is higher than the height of the peripheral wall 16A. The distal end of the detent pin 72, which projects into the interior of the lower case 18, is elastically deformable in a directions of swinging toward the left and right and the front and back of the case 12.

The write protect portion 60 has the accidental deletion preventing plug 74 as a switching member. Note that, when the accidental deletion preventing plug 74 is described by using the front-back, left-right, and top-bottom directions, these basically correspond to the respective directions in the state in which the accidental deletion preventing plug 74 is assembled in the case 12.

Figure 9A:
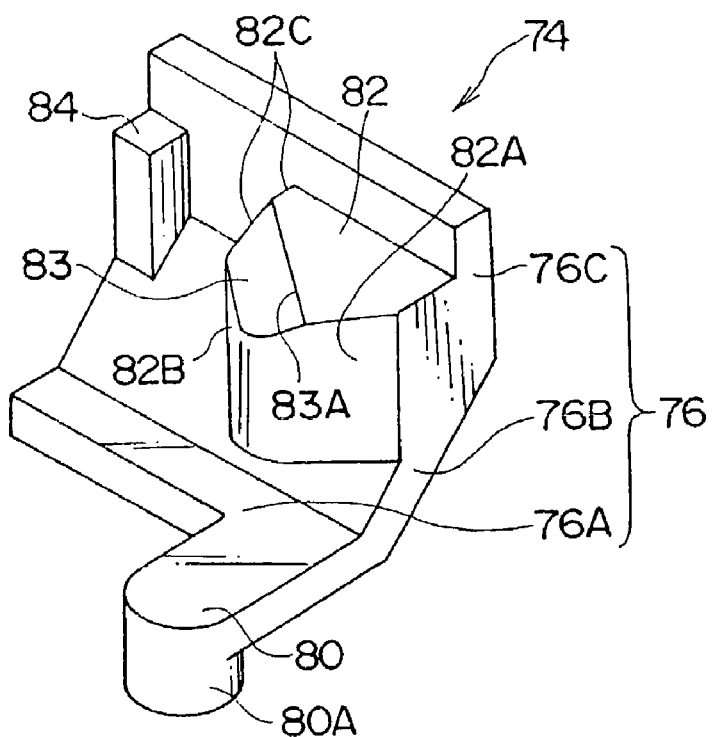
FIGS. 9A and 9B are perspective views showing an accidental deletion preventing plug forming the write protect portion of the recording tape cartridge relating to the embodiment of the present invention, where
Figure 9B:
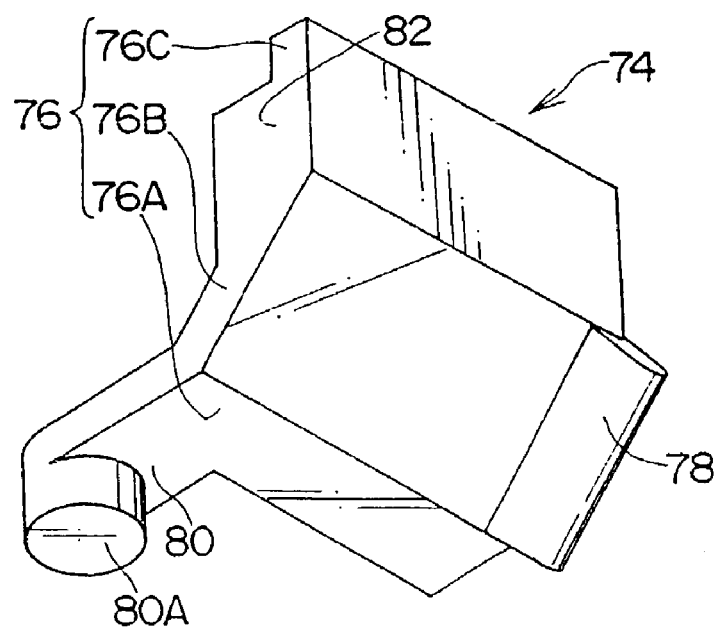

As shown in FIGS. 9A and 9B, the accidental deletion preventing plug 74 has a plate-shaped main body portion 76 which is bent in correspondence with the inner surface of the rear portion of the case 12. Specifically, the main body portion 76 is structured to include a bottom surface portion 76A which runs along the bottom plate 18B, an inclined portion 76B which is inclined (bent) and extends, from the rear end of the bottom surface portion 76A, upwardly in correspondence with the inclined rear wall 18C, and a back surface portion 76C which is bent upwardly along the rear wall 12D from the top rear end of the inclined portion 76B.

The operation projection 78, whose longitudinal direction runs along the direction of inclination of the inclined portion 76B, projects at the right end portion of the inclined portion 76B of the main body portion 76. In the state in which the accidental deletion preventing plug 74 is assembled in the case 12, the operation projection 78 is in the operation hole 62 and exposed to the exterior, and is operated, from the outer side of the case 12 (the outer surface side of the inclined rear wall 18C), so as to move in the left-right direction.

The arm portion 80 extends forward from the left end portion of the bottom surface portion 76A of the main body portion 76. A recognition portion 80A, which projects downward, is provided at the distal end of the arm portion 80. The width (the left-right direction width) W of the arm portion 80 is smaller than the gap G between the guide pieces 66, 68, and is smaller than half of a length L of the recognition opening 64 (see FIG. 7). The distal end of the arm portion 80 is rounded so as to substantially correspond to the rounded both end portions of the recognition opening 64 (the inner surfaces of the leg portions 66A, 68A).

The recognition portion 80A is formed in a short solid cylindrical shape which corresponds to the distal end of the arm portion 80. In the state in which the accidental deletion preventing plug 74 is assembled in the case 12, the recognition portion 80A is within the recognition opening 64. Details of the recognition portion 80A (arm portion 80) will be described later. The write protect portion 60 is structured so as to switch between the possibility and the impossibility of writing information onto the magnetic tape T, in accordance with the longitudinal direction (left-right direction) position of the recognition portion 80A in the recognition opening 64.

A projecting portion 82 and a guide portion 84 project forward from the front surface side of the main body portion 76 which extends over the corner portion between the inclined portion 76B and the back surface portion 76C. The left end of the projecting portion 82 coincides with the left end of the main body portion 76. The right end of the projecting portion 82 reaches the left-right direction central portion of the main body portion 76. Substantially the front half portion of the projecting portion 82 is formed in a substantially triangular (mountain) shape as seen in plan view, such that the width decreases toward the distal end. The left side of the substantially front half portion of the projecting portion 82 is a taper surface 82A, and the right side thereof is a taper surface 82B.

The projecting portion 82 corresponds to the abutment member in the present invention. In the state in which the accidental deletion preventing plug 74 is assembled in the case 12, the projecting portion 82 abuts the detent pin 72 at the substantially front half portion of either one of the taper surfaces 82A, 82B.

An inclined surface 83 is provided at the top surface of the projecting portion 82. As seen in plan view, the inclined surface 83 is formed in a substantially trapezoidal shape which is surrounded by the taper surface 82B, a rear edge 83A which is parallel to the taper surface 82B, the substantially front half (right half) portion of the taper surface 82A, and a right end surface 82C of the projecting portion 82. The inclined surface 83 is inclined so as to continuously become lower from the rear edge 83A toward the taper surface 82B. Namely, the inclined surface 83 is formed so as to be inclined with respect to both the top-bottom direction, which is the direction in which the upper case 16 and the lower case 18 are joined together, and the left-right direction, which is the direction of movement of the accidental deletion preventing plug 74 (the longitudinal direction of the recognition opening 64). Note that the inclined surface 83 having the above-described structure is inclined with respect to the front-back direction as well.

The guide portion 84 is positioned at the right end portion of the main body portion 76. The top end surface of the guide portion 84 is at the same level as (the height thereof coincides with that of) the top end surface of the projecting portion 82. In the state in which the accidental deletion preventing plug 74 is assembled in the case 12, the respective top end surfaces of the projecting portion 82 and the guide portion 84 abut the bottom end surface of the guide wall 70 of the case 12.

The above-described accidental deletion preventing plug 74 is assembled into the case 12, and forms the write protect portion 60. Specifically, as shown in FIG. 8, at the accidental deletion preventing plug 74, in the state in which the bottom surface portion 76A (the arm portion 80), the inclined portion 76B, and the back surface portion 76C of the main body portion 76 slidingly contact the inner surfaces of the bottom plate 18B, the inclined rear wall 18C, and the rear wall 12D (the peripheral walls 16A, 18A) of the case 12 respectively, the operation projection 78 is in the operation hole 62 and the recognition portion 80A is in the recognition opening 64.

Figure 10A:
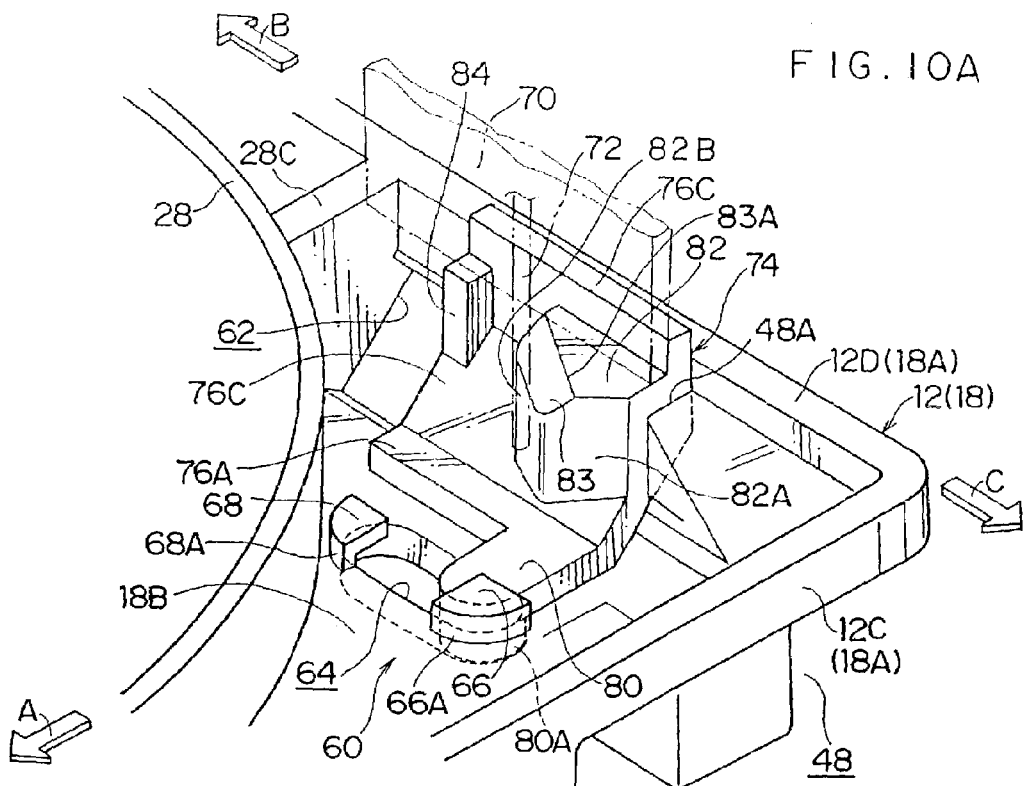
FIGS. 10A and 10B are perspective views, as seen from the inner side, of the write protect portion of the recording tape cartridge relating to the embodiment of the present invention, where
Figure 10B:
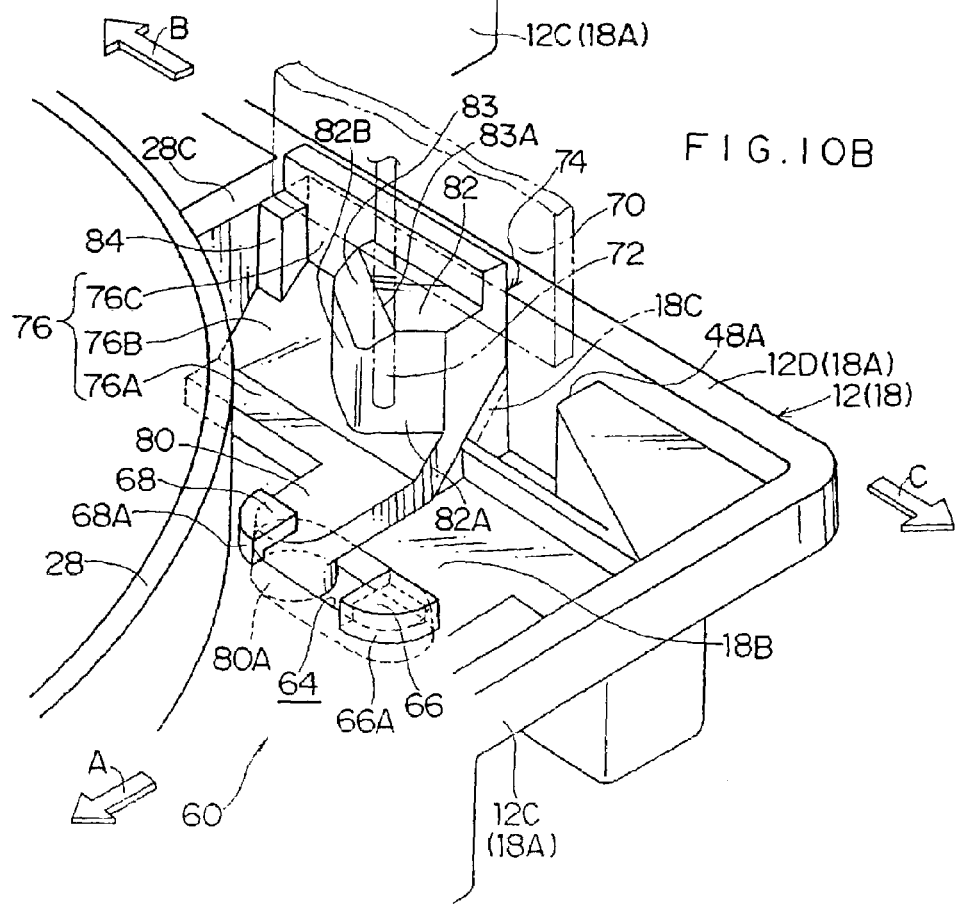

In this state, as shown in FIG. 10A or FIG. 10B, the bottom end surface of the guide wall 70 substantially contacts the respective top end surfaces of the projecting portion 82 and the guide portion 84 slidingly, and the rear surface of the guide wall 70 substantially contacts the front surface of the back surface portion 76C slidingly. Further, the detent pin 72 abuts one of the taper surfaces 82A, 82B. The recognition portion 80A is positioned at either one of the left and right end portions of the recognition opening 64, and the top surface of the arm portion 80 substantially contacts the guide piece 66 or the guide piece 68 slidingly.

Figure 11A:
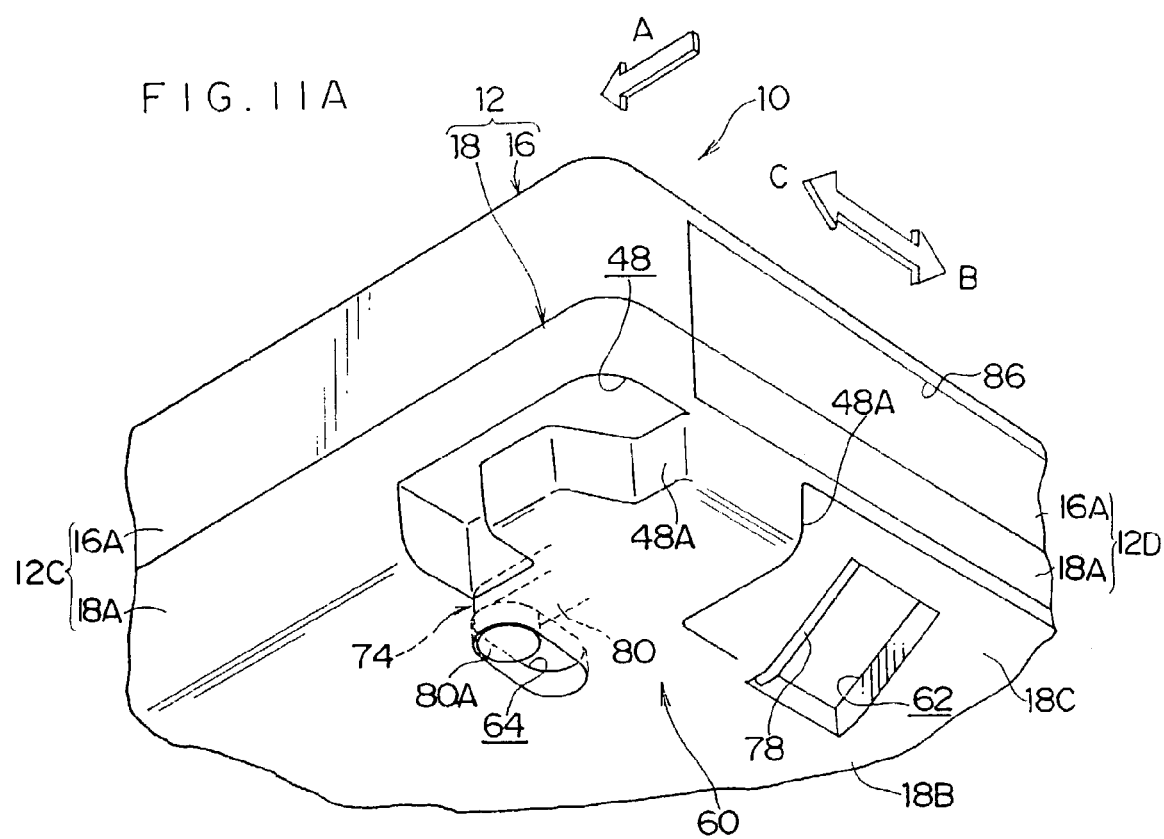
FIGS. 11A and 11B are perspective views, as seen from the outer side, of the write protect portion of the recording tape cartridge relating to the embodiment of the present invention, where
Figure 11B:
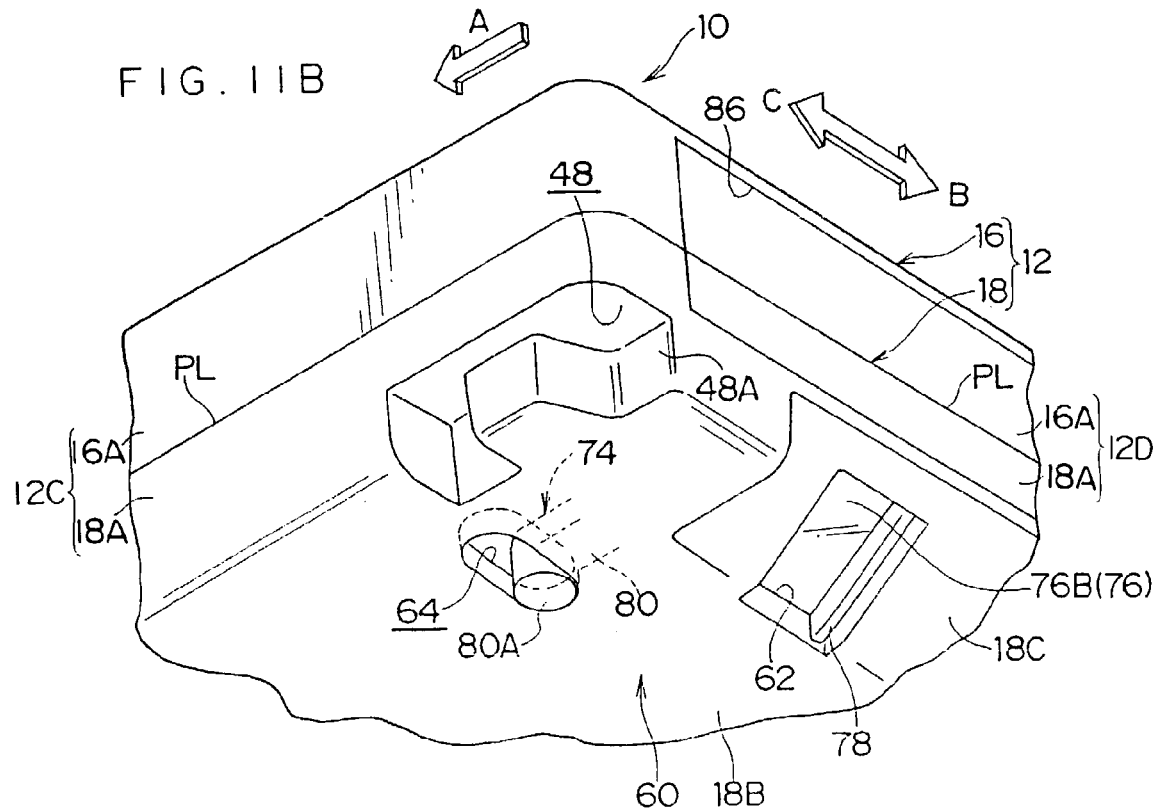

Namely, at the write protect portion 60, as shown in FIGS. 10A and 11A, when the detent pin 72 abuts the taper surface 82B and the operation projection 78 is positioned at the left end portion of the operation hole 62, the recognition portion 80A closes the left end portion of the recognition opening 64. As shown in FIGS. 10B and 11B, when the detent pin 72 abuts the taper surface 82A and the operation projection 78 is positioned at the right end portion of the operation hole 62, the recognition portion 80A closes the right end portion of the recognition opening 64.

At the write protect portion 60, in the state in which the recognition portion 80A closes the right end portion of the recognition opening 64 (the state shown in FIGS. 10B and 11B), there is a non-recordable state in which recording of information onto the magnetic tape T is not possible. Specifically, at the drive device, recording onto the magnetic tape T is not possible either when a recognition pin of a mechanical recognizing means (both not shown) abuts the recognition portion 80A, or when the recognition portion 80A is detected by an optical recognizing means (not shown). Namely, the accidental deletion preventing plug 74 closes the right end portion of the recognition opening 64 by the recognition portion 80A. When this is recognized at the drive device, information cannot be recorded onto the magnetic tape T by the drive device. Note that, at this time, the operation hole 62 is closed by the inclined portion 76B of the accidental deletion preventing plug 74.

On the other hand, at the write protect portion 60, in the state (shown in FIGS. 10A and 11A) in which the recognition portion 80A closes the left end portion of the recognition opening 64, or in other words, in the state in which the recognition portion 80A opens the right end portion of the recognition opening 64, the aforementioned recognition pin or the optical recognizing means does not detect the recognition portion 80A. Thus, there is a recordable state in which recording of information onto the magnetic tape T by the drive device is possible. In this state, the operation hole 62 is open.

In this way, due to the recognition portion 80A of the arm portion 80 opening and closing the right end portion of the recognition opening 64, the accidental deletion preventing plug 74 can selectively switch between a state in which recording onto the magnetic tape T is impossible and a state in which recording onto the magnetic tape T is possible (to switch between the possibility/impossibility of recording).

Further, at the write protect portion 60, due to the accidental deletion preventing plug 74 moving in the left-right direction by operation of the operation projection 78, the accidental deletion preventing plug 74 deforms the detent pin 72 which abuts at the taper surface 82A or the taper surface 82B, and rides over the detent pin 72. In this way, at the write protect portion 60, the operator carrying out the operation can feel a sense of "notching" (a detent sensation), and inadvertent movement (the above-described switching between the possibility/impossibility of recording) of the accidental deletion preventing plug 74 can be impeded.

Moreover, at the write protect portion 60, upward movement of the accidental deletion preventing plug 74 (movement in the direction of moving away from the bottom plate 18B) is restricted by the guide walls 66, 68 which the arm portion 80 substantially contacts, and by the guide wall 70 which the respective top end surfaces of the projecting portion 82 and the guide portion 84 substantially contact. Further, forward movement of the accidental deletion preventing plug 74 is restricted by the guide wall 70 which the back surface portion 76C substantially contacts, and by the recognition opening 64 (the respective inner surfaces of the leg portions 66A, 68A corresponding to the distal end of the arm portion 80) into which the recognition portion 80A enters. Only movement in the left-right direction by operation of the operation projection 78 is permitted (the accidental deletion preventing plug 74 is guided in the left-right direction).

A label area 86 is formed as a recess in the outer surface (back surface) of the rear wall 12D of the case 12. The label area 86 is formed in a substantially rectangular shape, as seen in rear view, which extends along substantially the entire longitudinal direction of the rear wall 12D. A parting line PL is positioned at the substantially central portion of the label area 86. The operation hole 62 is provided at the inclined rear wall 18C, and the write protect portion 60 does not have any portion which is exposed at the rear wall 12D. Thus, the label area 86 can be made to have a large surface area. Moreover, the operation hole 62 (operation projection 78) can be seen from the back surface side of the case 12. Thus, for example, even in the state in which the cases 12 are stacked in the direction of thickness thereof or the state in which the case 12 is accommodated within a holder of a library device or the like, the user can confirm, from the back surface side, the possibility/impossibility of recording onto the magnetic tape T in accordance with the open or closed state of the operation hole 62.

Next, operation of the present embodiment and the processes of assembling the recording tape cartridge 10 (the write protect portion 60) will be described.

In the recording tape cartridge 10 having the above-described structure, the operation projection 78 of the accidental deletion preventing plug 74 which forms the write protect portion 60 is operated by the user as needed, such that the possibility/impossibility of recording onto the magnetic tape T is switched.

In the state in which recording onto the magnetic tape T is impossible in which the recognition portion 80A of the accidental deletion preventing plug 74 closes the right end portion of the recognition opening 64, even if the recording tape cartridge 10 is loaded into a drive device, the drive device will recognize the non-recordable state (the recognition portion 80A positioned at the right end portion of the recognition opening 64) by the aforementioned mechanical or optical recognizing means, and there will be a state in which recording of information onto the magnetic tape T is not possible. In this way, for example, the information which is recorded on the magnetic tape T is protected. On the other hand, playback of information recorded onto the magnetic tape T is permitted.

Further, in the state in which recording onto the magnetic tape T is possible in which the recognition portion 80A of the accidental deletion preventing plug 74 opens the right end portion of the recognition opening 64, when the recording tape cartridge 10 is loaded into a drive device, the drive device cannot recognize the non-recordable state (the recognition portion 80A positioned at the substantial right half of the recognition opening) by the aforementioned mechanical or optical recognizing means, and there is a state in which recording onto the magnetic tape T is possible. Further, in this state as well, playback of information recorded on the magnetic tape T is permitted.

Within the drive device, due to the engagement projection 88 of the drive device engaging with the operation projection 52 of the door 50 as the recording tape cartridge 10 is loaded in, the door 50 rotates substantially rearwardly such that the opening 20 is opened. The leader pin 22 is pulled-out by the pull-out mechanism and is accommodated at a take-up reel of the drive device. In this way, when an instruction to record information is given to the drive device, the take-up reel and the reel 14 are driven to rotate synchronously, and the magnetic tape T is successively pulled-out from the case 12 while being taken-up onto the take-up reel. Recording of information onto the magnetic tape T is carried out by a recording/playback head disposed along a predetermined tape path.

On the other hand, when an instruction to play back information is given to the drive device, regardless of the switched state of the write protect portion 60 (i.e., regardless of the possibility/impossibility of recording onto the magnetic tape T), in the same way as in the above-described case of recording information onto the magnetic tape T, the magnetic tape T is successively pulled-out from the case 12 while being taken-up onto the take-up reel. Information is played-back by the recording/playback head disposed along the predetermined tape path.

After the magnetic tape T has been used (i.e., after the aforementioned recording or playback), the recording tape cartridge 10 is ejected from the drive device. Accompanying this ejection, the door 50 closes the opening due to the urging force of the coil spring 56.

At the time of assembling the recording tape cartridge 10 (the write protect portion 60), the accidental deletion preventing plug 74 is merely lowered toward the bottom plate 18B so that the arm portion 80 passes through the gap G between the pair of guide pieces 66, 68 (see FIG. 7). Thus, the recognition portion 80A enters in (is inserted into) the recognition opening 64, and the arm portion 80 is positioned at the recognition opening 64. At this time, the recognition portion 80A is positioned at the substantially central portion in the longitudinal direction of the recognition opening 64 (between the recording-impossible position where the recognition portion 80A closes the right end of the recognition opening 64, and the recording-possible position where the recognition portion 80A opens the right end portion of the recognition opening 64), and the accidental deletion preventing plug 74 is able to move freely in the left-right direction.

Figure 12:
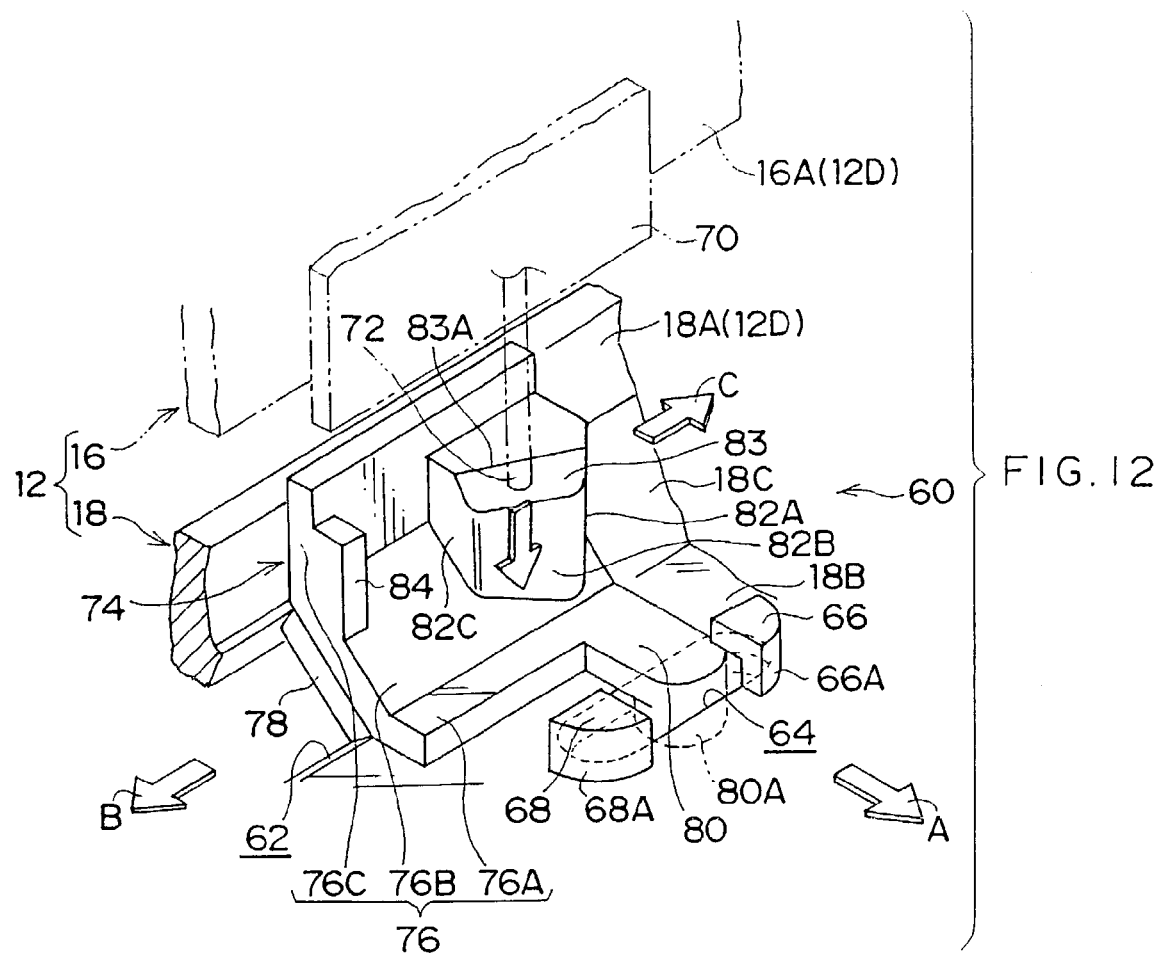
FIG. 12 is a perspective view showing a state in which a detent pin is sliding along an inclined surface of the accidental deletion preventing plug, at the time of joining of the upper case to the lower case forming the recording tape cartridge relating to the embodiment of the present invention.

From this state, as shown in FIG. 12, when the upper case 16 is mounted to the lower case 18 (i.e., when the upper case 16 is moved in the joining direction), the distal end of the detent pin 72 of the upper case 16 abuts the inclined surface 83 of the accidental deletion preventing plug 74. Then, the downward moving force of the upper case 16 is converted into leftward moving force while the detent pin 72 relatively slides along the inclined surface 83, and the accidental deletion preventing plug 74 is thereby moved toward the left (in the direction of arrow C). At this time, because the inclined surface 83 is inclined with respect to the front-back direction as well such that the front side thereof becomes lower, the detent pin 72 slides along the inclined surface 83 while escaping (deforming) toward the front and the right.

When the accidental deletion preventing plug 74 moves to the position where the recognition portion 80A is positioned at the left end portion of the recognition opening 64, the state in which the distal end of the detent pin 72 is sliding at (abutting) the inclined surface 83 ends, and the accidental deletion preventing plug 74 abuts (the side peripheral surface of) the detent pin 72 at the taper surface 82B. In this way, the arm portion 80 is pressed (or regulated) by the guide piece 66, the detent pin 72 abuts the taper surface 82B, and the accidental deletion preventing plug 74 is positioned at the position of opening the right end portion of the recognition opening 64 which should be the position at the time of shipping the recording tape cartridge 10 (the position at which recording onto the magnetic tape T is possible).

Moreover, when the peripheral wall 16A of the upper case 16 abuts the peripheral wall 18A of the lower case 18, as described above, the upper case 16 and the lower case 18 are fastened together by screws at the screw bosses 32, 36 and other screw bosses. In this state, the guide wall 70 slidingly contacts the front surface of the back surface portion 76C and the respective top end surfaces of the projecting portion 82 and the guide portion 84.

In this way, when assembly of the recording tape cartridge 10 is completed, the write protect portion 60 (the notching sensation imparting portion) is formed. Namely, at the write protect portion 60, the detent pin 72 abuts the taper surface 82B of the accidental deletion preventing plug 74. Inadvertent switching from the recording-possible state to the recording-impossible state is impeded, and it is possible to switch the possibility/impossibility of recording onto the magnetic tape T by imparting a moderate operation force to the operation projection 78.

In this way, because the inclined surface 83 having the above-described structure is provided at the accidental deletion preventing plug 74, as the upper case 16 is joined (mounted) to the lower case 18, the accidental deletion preventing plug 74 moves toward the left, i.e., toward the position at which recording onto the magnetic tape T is possible, and does not impede the mounting of the upper case 16 to the lower case 18 or break the detent pin 72. Thus, when the upper case 16 is joined to the lower case 18, i.e., at the time of assembling the recording tape cartridge 10, there is no need for careful and complex operations. In particular, as described above, the inclined surface 83 is inclined with respect to the front-back direction as well and causes the detent pin 72, which slides therealong, to escape toward the front and the right. Therefore, it is possible to even more reliably prevent breakage of the detent pin 72.

Moreover, the accidental deletion preventing plug 74 can be moved to and disposed at the position at which recording onto the magnetic tape T is possible, which is the position at which the accidental deletion preventing plug 74 should be disposed during shipping, as the upper case 16 is joined to the lower case 18 as described above (i.e., without going through an independent process for moving the accidental deletion preventing plug 74 toward the left). Thus, the number of processes for assembling the recording tape cartridge 10 is reduced.

In this way, in the recording tape cartridge 10 relating to the present embodiment, even if the position of the accidental deletion preventing plug 74 of the write protect portion 60 is offset from the recording-possible position (the position of opening the right end portion of the recognition opening 64), the upper case 16 and the lower case 18 can be joined together, and the assemblability is good.

Note that, in the above-described embodiment, the projecting portion 82 which has the inclined surface 83 is provided at the accidental deletion preventing plug 74, and the detent pin 72 is provided at the upper case 16. However, the present invention is not limited to the same. For example, the detent pin 72 may stand erect at the main body portion 76 (the bottom surface portion 76A) of the accidental deletion preventing plug 74, and the projecting portion 82 having the inclined surface 83 may be provided at the ceiling plate 16B or at the peripheral wall 16A. Further, it goes without saying that the flexible member in the present invention is not limited to the detent pin 72, and that the abutment member in the present invention is not limited to the projecting portion 82. Accordingly, for example, in place of the detent pin 72, it is possible to provide a thin-plate-shaped detent piece which can elastically deform in the direction of thickness.

Further, the present embodiment is a preferable structure in which the inclined surface 83 is a one-side inclined surface which moves the accidental deletion preventing plug 74 toward the left while the distal end of the detent pin 72 slides therealong. However, the present invention is not limited to the same. For example, the inclined surfaces 83 may be provided at both sides of the top end of the projecting portion 82 so as to form a mountain-shape in front view. In this case as well, it is preferable that each of the inclined surfaces 83 at the both sides are inclined with respect to the front-back direction as well. Moreover, the inclined surface 83 is not limited to a structure which is formed to be flat, and may be formed in a curved configuration.

In the present invention, it suffices that the accidental deletion preventing plug 74 can switch the possibility/impossibility of recording by moving in a direction along the bottom plate 18B (a direction intersecting the joining direction of the upper case 16 and the lower case 18, i.e., the front-back direction or the left-right direction or the like), and that the accidental deletion preventing plug 74 can move in the left-right direction or the like while the inclined surface 83 slides along the flexible member (the detent pin 72). The present invention is not limited by the configuration of the accidental deletion preventing plug 74, or the structure of the guide member provided at the case 12, or the like. Accordingly, for example, a structure in which the accidental deletion preventing plug 74 or the like does not have the recognition portion 80A may be used. In this case, it suffices for the recognition opening 64 to be provided only at the portion corresponding to the right end portion. Moreover, for example, a structure may be used in which the operation projection 78 is exposed to the exterior from the recognition opening 64, and the operation hole 62 is not provided. Further, the possibility/impossibility of recording may be switched by the accidental deletion preventing plug 74 moving in the left-right direction and opening and closing the recognition opening 64 (which may serve as the operation hole 62 as well) which is provided at the rear wall 12D or at the inclined rear wall 18C.

Moreover, in the above-described embodiment and modified examples, the recording tape cartridge 10, in which a single reel on which the magnetic tape T is wound is accommodated within the case 12, was used as an example of an embodiment of the cartridge of the present invention. However, the present invention is not limited to the same. For example, the cartridge of the present invention may be applied to a so-called two-reel type recording tape cartridge in which two reels for the drawing-out and taking-up of the magnetic tape T are accommodated within the case 12, or to a disk cartridge in which a disc-shaped disk medium (such as an optical disk or a magnetic disk or the like) is rotatably accommodated within the case 12. Moreover, it goes without saying that the structure of the recording tape cartridge to which the present invention is applied is not limited to the above-described recording tape cartridge 10.

As described above, the cartridge relating to the present invention has good assemblability, and an upper case and a lower case can be joined together even if the position of a switching member is offset.

What is claimed is:

1. A cartridge for accommodating a recording medium, which cartridge has a first mode which prohibits recording of information onto the recording medium and a second mode in which recording of information onto the recording medium is possible, the cartridge comprising:

a case provided with a lower case having a bottom plate, and an upper case joined together with the lower case so as to have an accommodating space at an interior, the recording medium being accommodated in the interior;

a switching member for switching the mode, which is provided so as to be movable along the bottom plate of the lower case between a first position corresponding to the first mode and a second position corresponding to the second mode, and which is selectively positioned at the first position and the second position;

a flexible member having flexibility and provided within the case so as to generate an urging force in a restoring direction by being bent; and an abutment member having a region which is abutted by the flexible member, wherein the flexible member and the abutment member are disposed so as to form a structure for cooperating with each other to position the switching member at one of the first position and the second position, the abutment member has at least one inclined surface, and when the upper case and the lower case are moved relatively so as to be joined together, the flexible member is moved from a state of non-contact with the inclined surface to a state of contact with the inclined surface, such that the flexible member abuts the inclined surface and relatively slides on the inclined surface, whereby relative positions of the flexible member and the abutment member are determined and the switching member is positioned at one of the first position and the second position.

2. The cartridge of claim 1, wherein the abutment member receives urging force from the flexible member at the region abutted by the flexible member, and urges the switching member in one of a direction toward the first position and a direction toward the second position.

3. The cartridge of claim 2, wherein the region abutted by the flexible member has at least two different surfaces, and in accordance with the surface which is abutted, a direction of the urging force received from the flexible member changes, and a direction of the switching member is switched between the direction toward the first position and the direction toward the second position.

4. The cartridge of claim 3, wherein when the switching member is moved from one of the first position and the second position to the other of the first position and the second position, the flexible member is bent so as to ride over one surface which the abutment member abuts, abuts another surface, and switches a direction of urging.

5. The cartridge of claim 1, wherein the flexible member is provided at the upper case, and the abutment member is provided at the switching member.

6. The cartridge of claim 1, wherein the abutment member is provided at the upper case, and the flexible member is provided at the switching member.

7. The cartridge of claim 1, wherein the flexible member has a shape that is substantially solid and substantially cylindrical.

8. The cartridge of claim 1, wherein the flexible member has a substantially planar shape.

9. The cartridge of claim 1, wherein the at least one inclined surface of the abutment member is a surface which is inclined with respect to a direction of relative movement for joining the upper case and the lower case, and a direction of movement of the switching member toward one of the first and second positions.

10. The cartridge of claim 9, wherein the abutment member has another inclined surface which is inclined with respect to the direction of relative movement for joining the upper case and the lower case, and another direction of movement of the switching member.

11. The cartridge of claim 1, wherein the at least one inclined surface of the abutment member has a substantially flat surface.

12. The cartridge of claim 1, wherein the inclined surface of the abutment member has a curved surface.

13. The cartridge of claim 1, wherein the structure is a detent structure.

14. The cartridge of claim 1, wherein the switching member is disposed so as to be slidable with respect to the case.

15. The cartridge of claim 1, wherein the switching member has an operation projection which is operated to switch a position of the switching member, and an opening is formed in the case, through which the operation projection is exposed such that the operation projection can be operated from an exterior.

16. The cartridge of claim 1, wherein the cartridge has a mode recognition portion, according to which the mode can be recognized by an exterior device.

17. The cartridge of claim 16, wherein the mode recognition portion extends from the switching member, a through hole is formed in the case, and the mode recognition portion is movably exposed through the through hole.

* * * * *